United States Patent
Chen et al.

(10) Patent No.: US 11,842,038 B1
(45) Date of Patent: Dec. 12, 2023

(54) HIDDEN INFORMATION SHARING IN VIRTUAL MEETINGS

(71) Applicant: International Business Machines Corporation, Armonk, NY (US)

(72) Inventors: Jing Wen Chen, Beijing (CN); Zhao Yu Wang, Beijing (CN); Peng Hui Jiang, Beijing (CN); Xiao Yi Tian, Beijing (CN); Jing Ren, Beijing (CN); Yi Jie Ma, Beijing (CN); Xizhuo Zhang, Beijing (CN); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/092,306

(22) Filed: Dec. 31, 2022

(51) Int. Cl.
G06F 17/00 (2019.01)
G06F 3/0484 (2022.01)
G06F 40/134 (2020.01)

(52) U.S. Cl.
CPC .......... *G06F 3/0484* (2013.01); *G06F 40/134* (2020.01)

(58) Field of Classification Search
CPC .............................. G06F 3/0484; G06F 40/134
See application file for complete search history.

(56) References Cited

U.S. PATENT DOCUMENTS

| | | | |
|---|---|---|---|
| 8,483,375 B2 | 7/2013 | Dhara et al. | |
| 9,411,789 B1 | 8/2016 | Chitta et al. | |
| 10,693,669 B2 | 6/2020 | Dave et al. | |
| 10,831,835 B2 | 11/2020 | Kyte et al. | |
| 2008/0189648 A1* | 8/2008 | Anglin | G06F 16/957 707/E17.119 |
| 2013/0254682 A1* | 9/2013 | DeLuca | G06F 16/9558 715/753 |
| 2017/0046315 A1* | 2/2017 | Chitta | G06F 16/954 |
| 2021/0377322 A1* | 12/2021 | Vajravel | H04L 12/1827 |

OTHER PUBLICATIONS

"Method of allowing viewer to click doc link in a shared screen," An IP.com Prior Art Database Technical Disclosure, IP.com No. IPCOM000235958D, Apr. 1, 2014.
"A mechanism to enable audiences independently fetch information from web conferencing," An IP.com Prior Art Database Technical Disclosure, IP.com No. IPCOM000236613D, May 6, 2014.
"Systems and Methods for Interactive Collaboration in Online Meeting," An IP.com Prior Art Database Technical Disclosure, IP.com No. IPCOM000267234D, Oct. 8, 2021.

* cited by examiner

*Primary Examiner* — Andrew T McIntosh
(74) *Attorney, Agent, or Firm* — Nelson IP; Daniel P. Nelson

(57) ABSTRACT

A method for sharing hidden information in a virtual meeting is disclosed. In one embodiment, such a method includes sharing, by way of a web-conference server, a source window presented on a source system with a target window presented on a target system. The method detects selection of a specific area on the target window and correlates the specific area on the target window with a corresponding area on the source window. The method determines whether the corresponding area on the source window links to hidden information, such as a hyperlink, on the source window. If the corresponding area links to hidden information, the method communicates one or more of the hidden information and a link to the hidden information to the target system. A corresponding system and computer program product are also disclosed.

20 Claims, 9 Drawing Sheets

900

| Page Number | Relative x1 | Relative y1 | Relative x2 | Relative y2 | Is a link? | Link Address |
|---|---|---|---|---|---|---|
| 10:23:59:006 | N/A | N/A | N/A | N/A | Out of Date | N/A |
| 10:25:00:021 | 20% | 30% | N/A | N/A | No | N/A |
| 10:25:00:021 | 50% | 50% | 80% | 55% | Yes | www.ibm.com |

HIDDEN INFORMATION SHARING IN VIRTUAL MEETINGS

BACKGROUND

Field of the Invention

This invention relates to systems and methods for sharing hidden information such as hyperlinks in virtual meetings.

Background of the Invention

When conducting a web conference or other virtual meeting, one or more participants in the meeting may have the capability to share a screen or window with other participants in the meeting. In such situations, the screen or window that is shared by one participant may appear the same or similar on the screens or windows of other meeting participants. What may not be shared, however, are elements on the shared screen or window that are hidden from view.

For example, a screen or window that is shared by one participant may contain hidden content that may only be revealed or utilized by a mouse click or other action by the sharing participant. The other participants in the virtual meeting may be unable to view or utilize this content on their remotely located screens or windows since they may not have access to the sharing participant's screen or window. For example, if a hyperlink is embedded in a shared screen or window, the hyperlink may only be accessible or usable to the sharing participant. Other participants may be unable to see or access this hyperlink from their remote locations. The same may be true for other hidden content, such as pop-up windows or boxes that are revealed by hovering over or otherwise selecting certain areas on the sharing participant's screen or window.

SUMMARY

The invention has been developed in response to the present state of the art and, in particular, in response to the problems and needs in the art that have not yet been fully solved by currently available systems and methods. Accordingly, systems and methods have been developed for sharing hidden information, such as hyperlinks, in a virtual meeting. The features and advantages of the invention will become more fully apparent from the following description and appended claims, or may be learned by practice of the invention as set forth hereinafter.

Consistent with the foregoing, a method for sharing hidden information in a virtual meeting is disclosed. In one embodiment, such a method includes sharing, by way of a web-conference server, a source window presented on a source system with a target window presented on a target system. The method detects selection of a specific area on the target window and correlates the specific area on the target window with a corresponding area on the source window. The method determines whether the corresponding area on the source window links to hidden information, such as a hyperlink, on the source window. If the corresponding area links to hidden information, the method communicates one or more of the hidden information and a link to the hidden information to the target system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 9 is a table showing information that may be stored in an information table in accordance with the invention.

DETAILED DESCRIPTION

Figure 1:
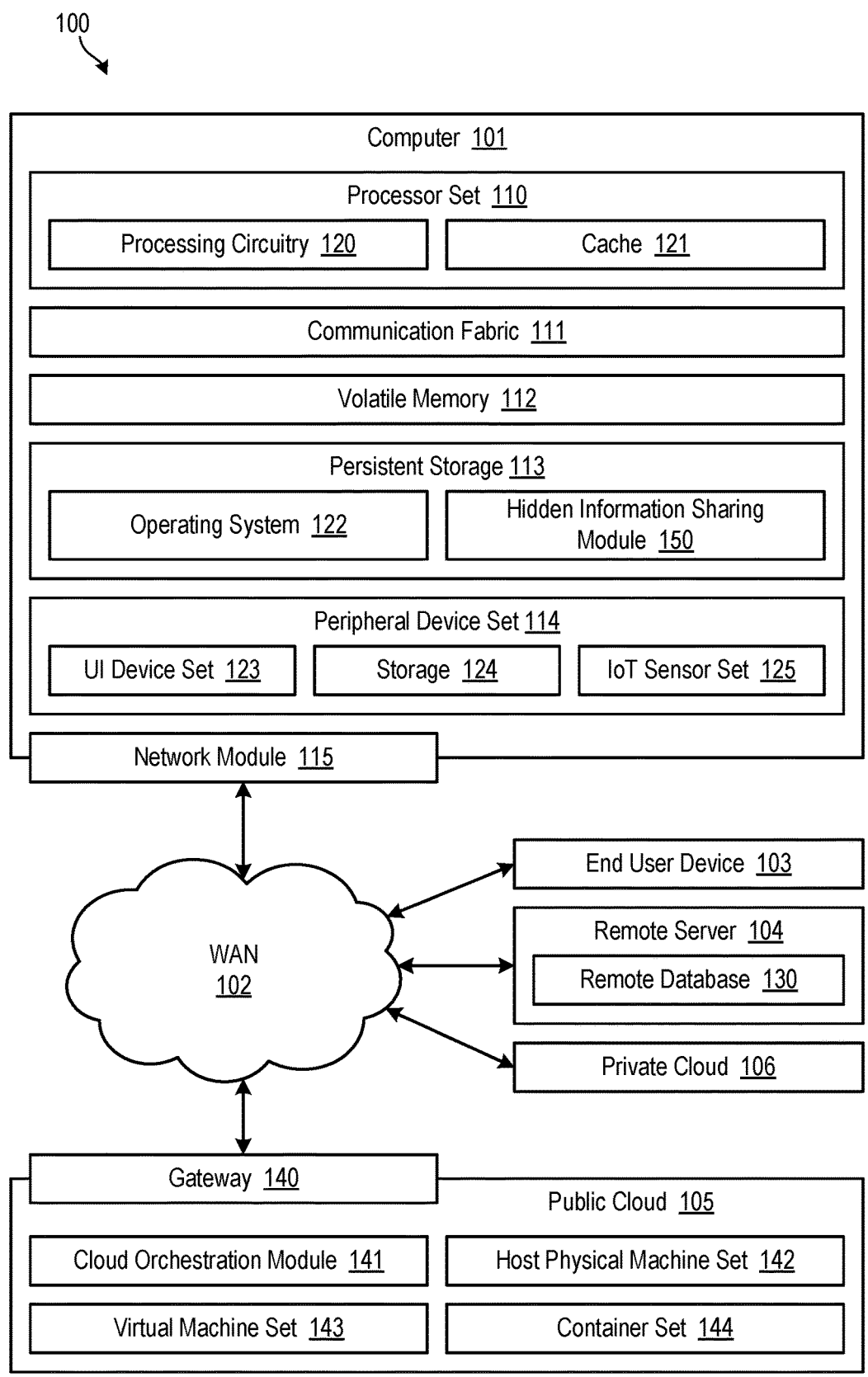
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 for sharing hidden information such as hyperlinks in virtual meetings (i.e., collectively referred to herein as a "hidden information sharing module 150"). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
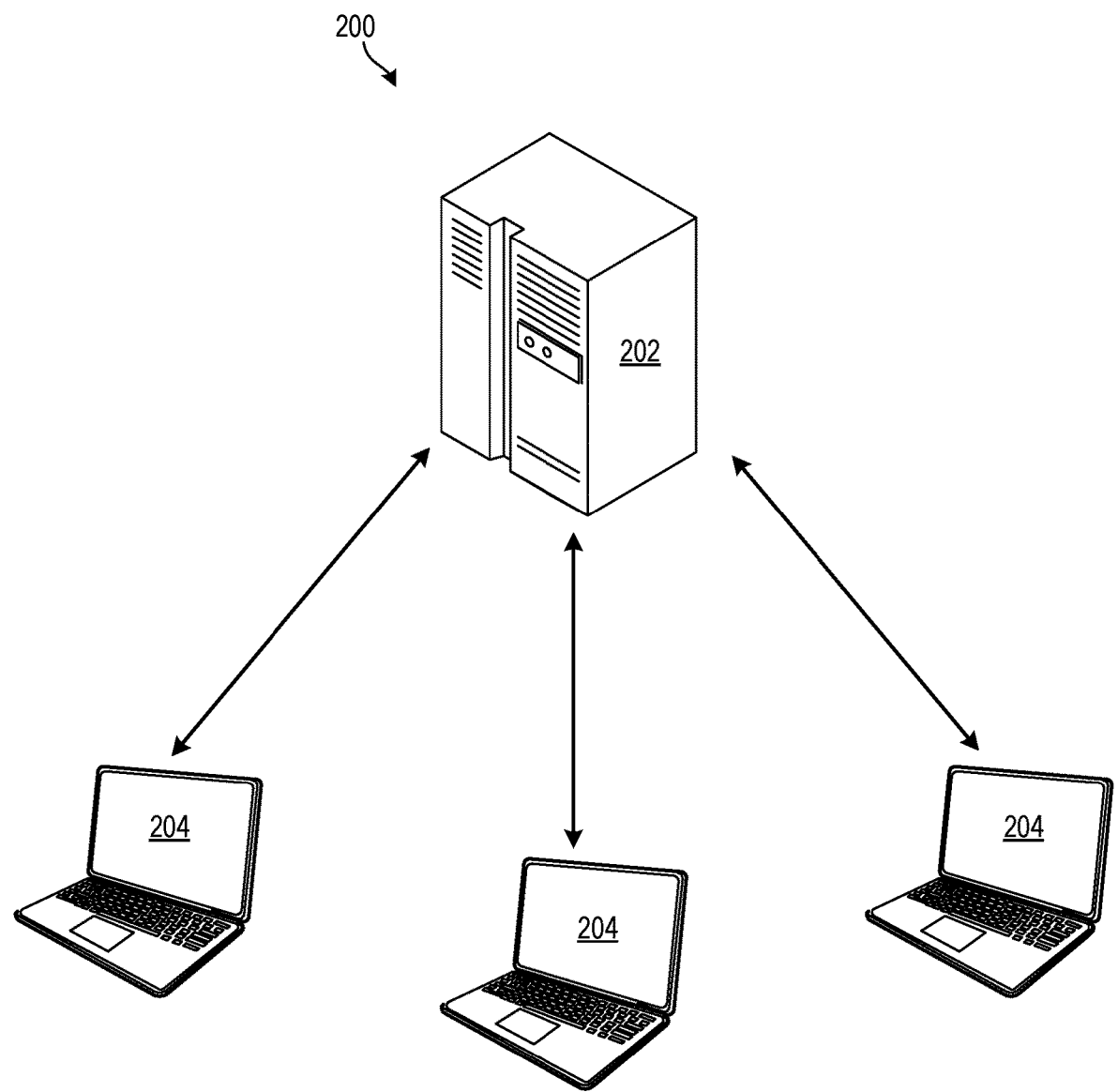
FIG. 2 is a high-level block diagram showing a web-conference server used to facilitate a virtual meeting between various client systems.

FIG. 2 is a high-level block diagram showing one embodiment of a system 200 for conducting a virtual meeting. As shown, such a system 200 may, in certain embodiments, include a web-conference server 202 and one or more client systems 204. In certain cases, one client system 204 may act as a host of a virtual meeting, while other client systems 204 may act as participants. In certain cases, during a virtual meeting, a host may share a window or screen of his or her computing system with one or more participants. Similarly, in other cases, any of the participants may share a window or a screen with the host and/or other participants in the virtual meeting. For the purposes of this disclosure, the client system 204 that shares a window or screen may referred to as a "source system" and the client systems 204 that receive the shared window or screen may be referred to as "target systems." Similarly, the window or screen that is shared may be referred to herein as a "source window" whereas a window or screen which receives the shared content may be referred to herein as a "target window."

Figure 3:
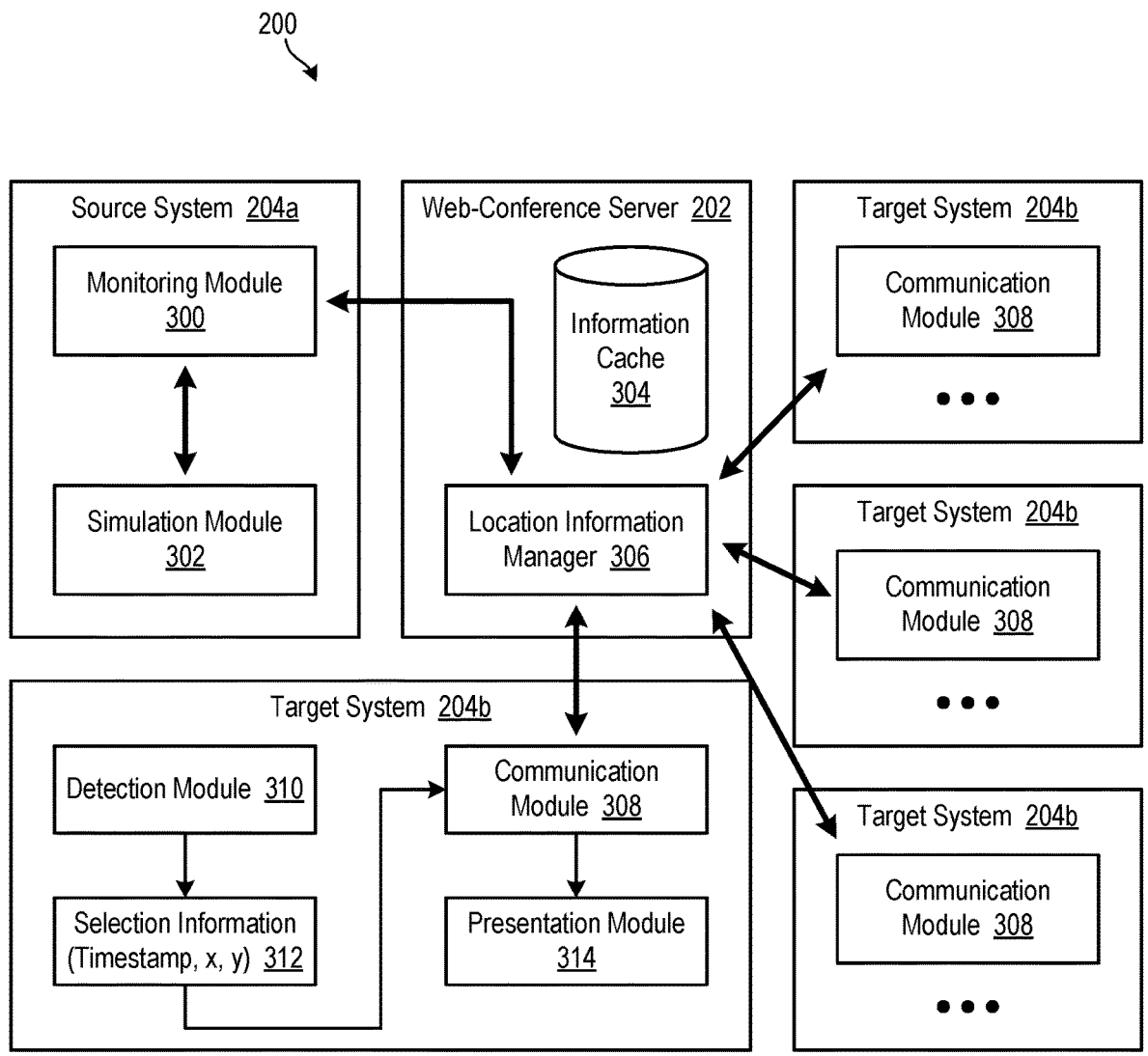
FIG. 3 is a high-level block diagram showing various modules that may be used to share hidden information in a virtual meeting.

Referring to FIG. 3, as described above, when conducting a virtual meeting, a source system 204*a* may share a source window with one or more target systems 204*b*. What may not be shared, however, are elements on the source window that are hidden from view. For example, a source window may contain hidden content that may only be revealed or utilized by a mouse click or other action on the source system 204*a*. The other participants in the virtual meeting may be unable to view or utilize this content on their remotely located screens or windows since they may not have access to the sharing participant's screen or window. For example, if a hyperlink is embedded in a source window, this hyperlink may only be accessible or usable on the source system 204*a*. Other participants (i.e., target systems 204*b*) may be unable to see or access this hyperlink from their remote locations. The same may be true for other hidden content, such as pop-up windows or boxes that are revealed by hovering over or otherwise selecting certain areas on the source window.

FIG. 3 shows one embodiment of a system 100 with functionality (e.g., modules, etc.) that may be used to share hidden information, such as hyperlinks, in a virtual meeting where a source window is shared with various target systems 204*b*. The modules shown in FIG. 3 may all collectively belong to or be associated with the hidden information sharing module 150 shown in FIG. 1.

As shown in FIG. 3, in certain embodiments, a target system 204*b* may include a detection module 310 to detect if a participant clicks or otherwise selects some location or element on the target window. If so, the target system 204*b* may record information 312 about the selection such as the timestamp of the target window on which the selection (e.g., mouse click) occurred and a location (e.g., x, y coordinates) that was selected on the target window.

A communication module 308 on the target system 204*b* may communicate the selection information 312 to the web-conference server 202, and more specifically to a location information manager 306 within the web-conference server 202. The location information manager 306 may determine if hidden information for the selected location or a link to the hidden information has already been determined and stored in the information cache 304 on the web-conference server 202. If so, the location information manager 306 may return the hidden information (e.g., hyperlink) to the communication module 308 of the requesting target system 204*b*. A presentation module 314 on the target system 204*b* may present the hidden information to a user of the target system 204*b*, such as by showing the user the hidden information or providing a link to the hidden information.

If location information manager 306 determines that the hidden information is not stored in the information cache 304, the location information manager 306 may transmit a request to a monitoring module 300 on the source system 204*a*. This request may contain the selection information 312. If the requested timestamp associated with the source window is not out-of-date (i.e., the source system 204*a* has not already transitioned to a new or different source window on the source system 204*a*), the simulation module 302 may simulate the selection (e.g., simulate a mouse click) on the source window at the location designated by the selection information 312. The simulation module 302 may do this to capture any hidden information (e.g., hyperlinks) that would be manifest by simulating the mouse click on the source window of the source system 204*a*.

Once any hidden information is captured, the hidden information may be returned to the location information manager 306 in the web-conference server 202 and the location information manager 306 may return the hidden information to the requesting target system 204*b*. The location information manager 306 may save the hidden information in its information cache 304 in the event it is requested again by the same or another target system 204*b*.

Figure 4:
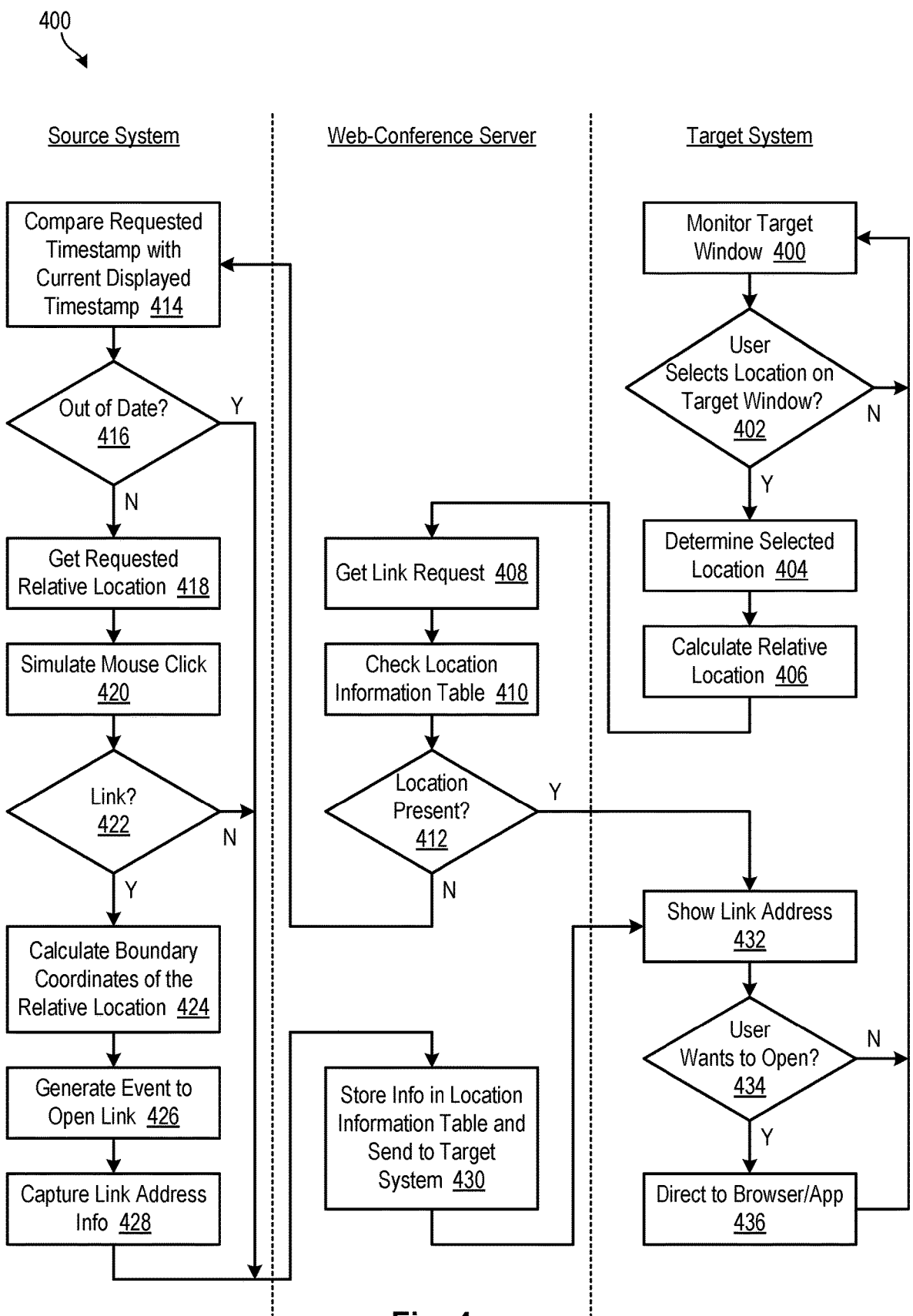
FIG. 4 is a process flow diagram showing one embodiment of a method for sharing hidden information in a virtual meeting.

Referring to FIG. 4, one embodiment of a method 400 for sharing hidden information in a virtual meeting is disclosed. As shown, functionality on the target system 204*b* monitors 400 a target window of a virtual meeting. In the event a user of the target system 204*b* selects 402 a location on the target window with a mouse click or the like, functionality on the target system 204*b* determines 404 the selected location and calculates 406 a relative location of the selection on the target window. One manner in which the relative location may be calculated will be discussed in association with FIGS. 7 and 8.

The web-conference server 202 may then receive 408 a hidden information (e.g., hyperlink) request from the target system 204*b* and check 410 an information table in the information cache 304 to determine if the selected location and any associated hidden information has been stored in the information table. If so, the web-conference server 202 returns the hidden information or a link to the hidden information to the target system 204*b*. At this point, the target system 204*b* may show 432 a link address to a user of the target system 204*b*. If the user wishes to open the link at step 434, the user may be directed 436 to a browser or application to view an address or page (e.g., website, etc.) associated with the link.

If, at step 412, the location is not present in the information table on the web-conference server 202, a request may be made to the source system 204*a* having the source window. At this point, the source system 204a may compare 414 a timestamp of the target window monitored at step 400 with a timestamp of the source window on the source system 204a. In essence, this step 414 compares the target window with the source window to determine if they are the same since the source system 204a may have already moved to a new source window (e.g., moved to a next slide in a presentation). This may be accomplished by comparing a timestamp of the target window with a timestamp of the source window to ensure that the target window and source window are the same or contain the same information.

If, at step 416, the source window is not out-of-date (meaning the current source window is the same as the target window associated with the request), the source system 204a may get 418 the requested relative location and simulate 420 a mouse click on the source window at the relative location. If, at step 422, the selected location is determined to be a link (i.e., hyperlink), the source system 204a may calculate a boundary location of the relative location (as will be discussed in association with FIG. 8) and generate 426 an event to open the link. This may allow the source system 204a to capture 428 the link address associated with the link.

This link address and other associated information may then be returned and stored 430 in the information table on the web-conference server 202 and the information may be sent 430 to the target system 204b that originated the request. The target system 204b may then show 432 a link address to a user of the target system 204b. If the user wishes to open the link at step 434, the user may be directed 436 to a browser or application to view an address associated with the link.

If the source window is out-of-date at step 416, or the simulated mouse click does not land on a link at step 422, the source system 204a may return to the web-conference server 202 and the web-conference server 202 may store the information in the information table and return the information to the target system 204b. In essence, the information table may record that the information requested by the target system 204b did not correspond to a link or current source window on the source system 204a. In such cases, no link may be returned to the target system 204b.

Figure 5:
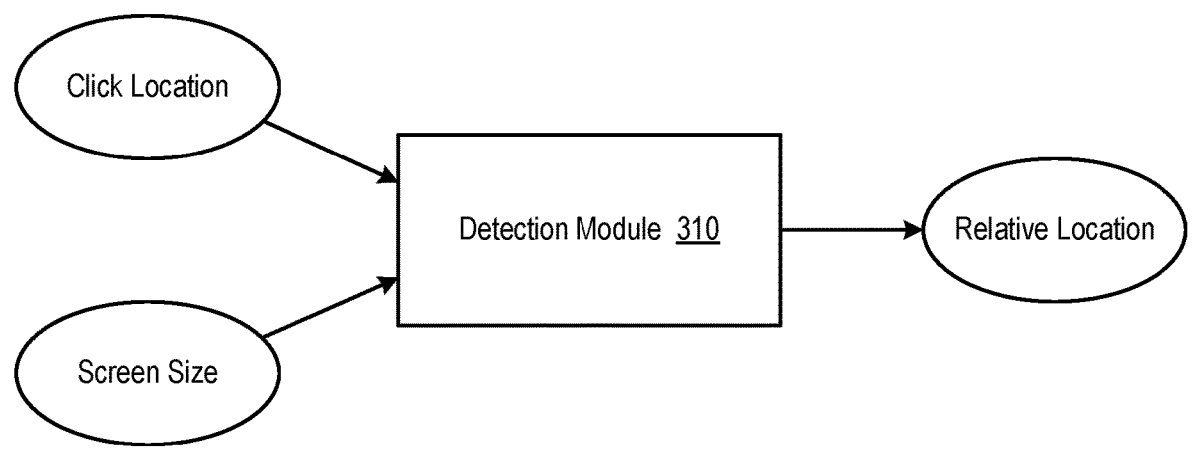
FIG. 5 is a high-level block diagram showing operation of a detection module in accordance with the invention.

Referring to FIG. 5, as previously mentioned, a target system 204b may include a detection module 310 to detect if a participant clicks or otherwise selects some location or element on a target window. As further explained, the target system 204b may record information 312 about the selection such as the timestamp of the target window on which the selection (e.g., mouse click) occurred and a location (e.g., x, y coordinates) that was selected on the target window. As shown in FIG. 5, in certain embodiments, when the selection is a mouse click, the detection module 310 may record a location 500 of the mouse click as well as a screen size of the target window on which the mouse click occurred. Using this information, the detection module 310 may calculate a relative location of the mouse click, as will be discussed in association with FIG. 8.

Figure 6:
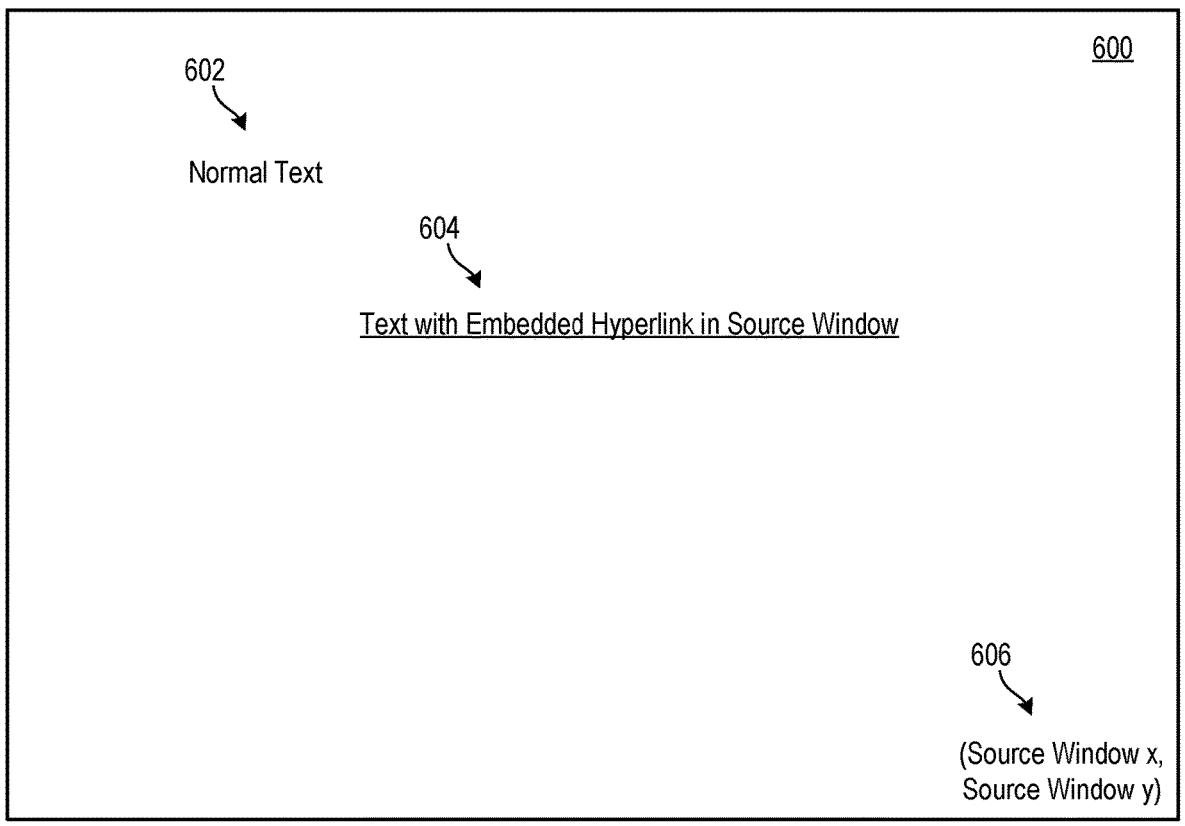
FIG. 6 is a high-level block diagram showing one example of a source window containing both normal text as well as text with an embedded hyperlink.

Referring to FIG. 6, one example of a source window 600 is illustrated. As shown, the source window may include both normal text 602 as well as text 604 embedded with a hyperlink or other hidden information. The source window 600 may also be characterized by x and y dimensions 606 which may indicate the screen size of the source window 600. As previously mentioned, the source window 600 may correspond to an entire screen of a user or a window within a screen of the user.

Figure 7:
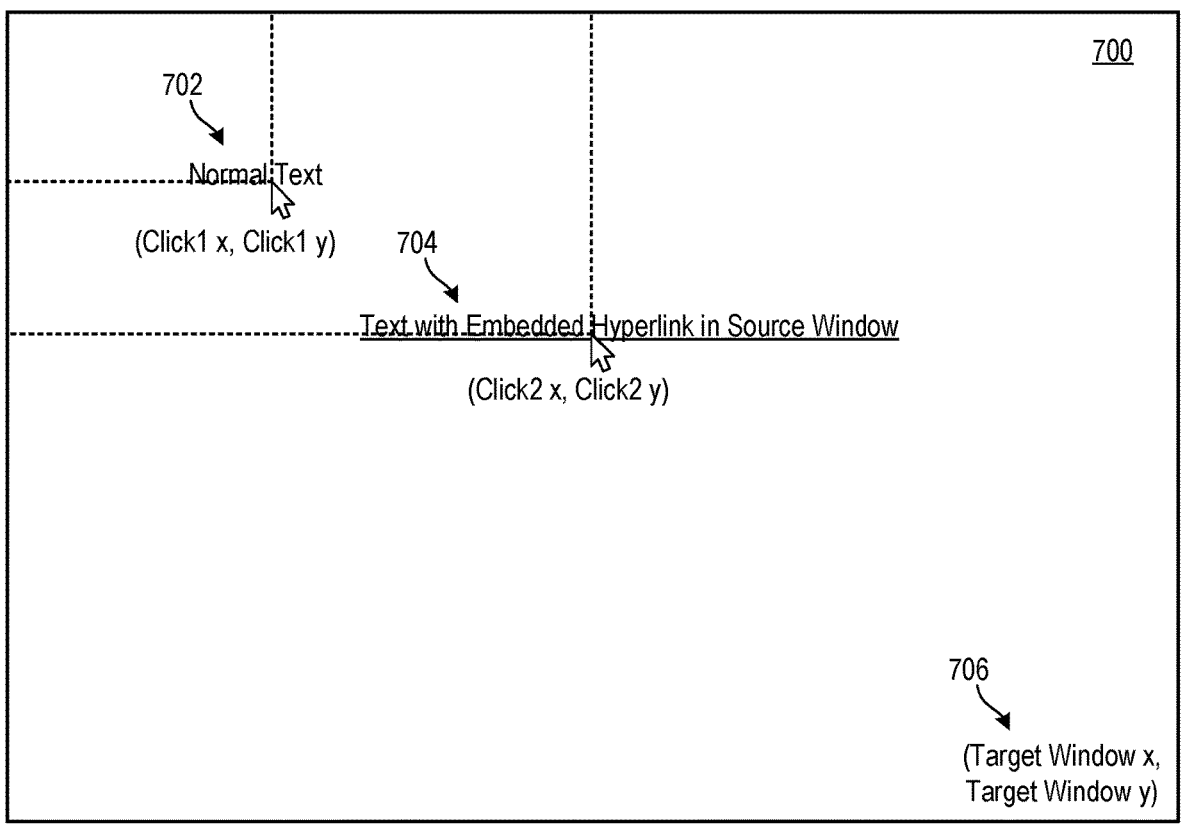
FIG. 7 is a high-level block diagram showing one example of a target window displaying the normal text as well as the text with an embedded hyperlink from the source window.

Referring to FIG. 7, one example of a target window 700 is illustrated. As shown, the target window 700 appears to be an exact or similar replica of the source window 600 illustrated in FIG. 6, which may normally be the case in a virtual meeting where a source system 204a is sharing a window or screen with a target system 204b. At the target system 204b, a user may click on the target window 700 with a mouse or other device. For example, the user may click on the normal text 702 at location coordinates (Click1 x, Click1 y). The user may also click on the text 704 at location coordinates (Click2 x, Click2 y). The detection module 310 previously discussed may record the coordinates of each of the mouse clicks. The target window 700 may also be characterized by x and y dimensions 706 which may indicate the screen size of the target window 700. Like the source window 600, the target window 700 may correspond to an entire screen of a user or a window within a screen of the user. Using the location of the mouse clicks and the screen size of the target window 700, the detection module 310 may calculate a relative location (x %, y %) of the mouse clicks within the target window 700. In certain embodiments, this may be accomplished using the equation: (x %, y %)=(Click x, Click y)/(target window x, target window y).

Figure 8:
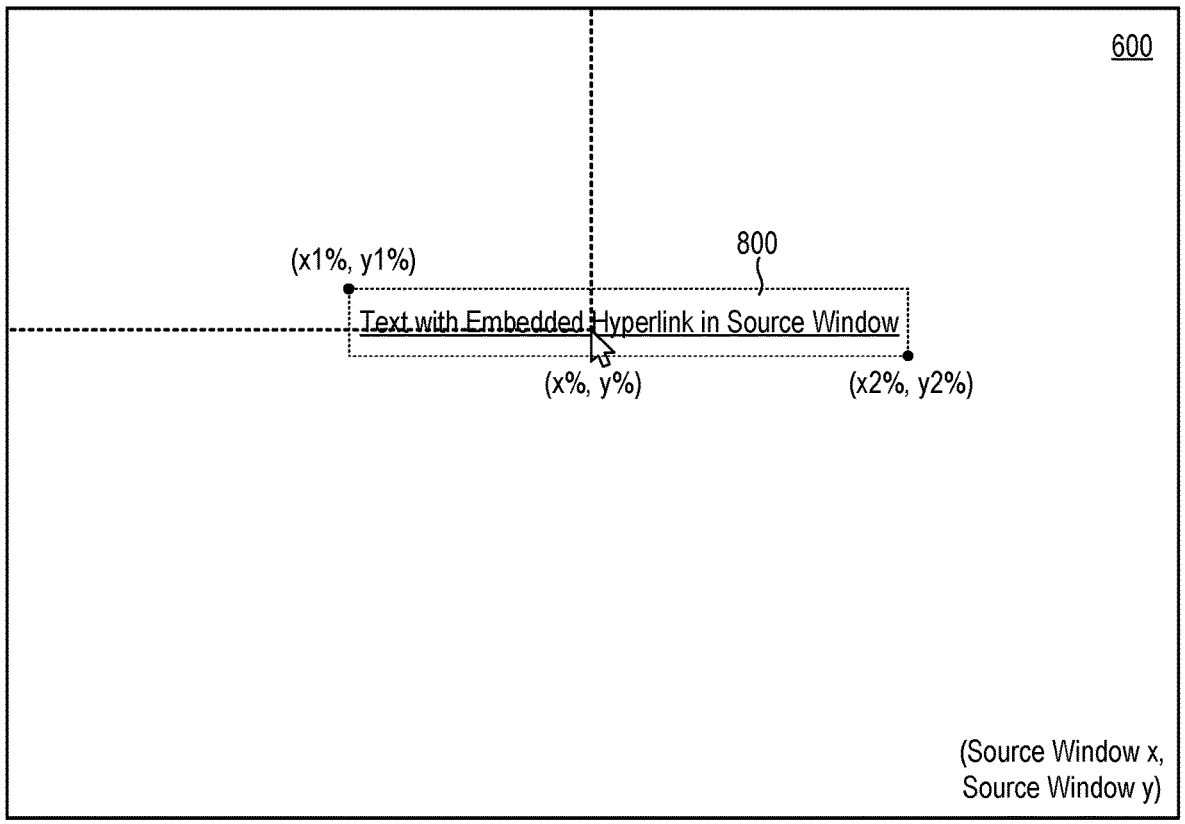
FIG. 8 is a high-level block diagram showing relative boundary coordinates of a relative location.

Referring to FIG. 8, when simulating the mouse click on the source window 600, the source system 204a may receive the relative location (x %, y %) of the mouse click from the target system 204b. Assuming the source window 600 is still valid (i.e., not out-of-date), the simulation module 302 on the source system 204a may simulate the mouse click on the source window 600. If the mouse click falls on text with an embedded hyperlink, the simulation module 302 may determine boundary coordinates (x1%, y1%), (x2%, y2%) of an area that encompasses the embedded hyperlink. The simulation module 302 may then generate an event to call the hyperlink and capture the hyperlink address. The simulation module 302 may then return the hyperlink address and the boundary coordinates to the web-conference server 202 as previously discussed, where they may be stored in the information table of the information cache 304.

FIG. 9 shows one embodiment of an information table 900 that may be included in the information cache 304. As shown, each row in the information table 900 may represent a result from a simulated mouse click on a source window. In some cases (e.g., row 1), a simulated mouse click was not performed on a valid source window since the source window was out-of-date when the request was received (as indicated by the recorded timestamp 902). In other cases (e.g., row 2), a simulated mouse click on a source window did not occur on text having an embedded hyperlink. Thus, no hyperlink was returned to the target system 204b for either row 1 or row 2. However, in other cases (e.g., row 3), a simulated mouse click on the source window fell on an area or text with an embedded hyperlink. In such a case, the address of the hyperlink was captured by the simulation module 302 and returned to the requesting target system 204b. Each of the above-described simulated mouse clicks may be stored in the information table 900 of the information cache 304 so the mouse clicks do not have to be simulated again in the event a similar request is received. The information may simply be returned to a target system 204b from the information cache 304. In certain embodiments, entries (e.g., rows) in the information table 900 may be periodically removed or cleared after a predefined period of time to make space in the information cache 304.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for sharing hidden information in a virtual meeting, the method comprising:
    sharing, by way of a web-conference server, a source window presented on a source system with a target window presented on a target system;
    detecting selection of a specific area on the target window;
    communicating information associated with the selection from the target system to the source system;
    correlating the specific area on the target window with a corresponding area on the source window;
    determining whether the corresponding area on the source window links to hidden information; and
    if the corresponding area links to hidden information, communicating at least one of the hidden information and a link to the hidden information to the target system.

2. The method of claim 1, wherein the hidden information is a hyperlink.

3. The method of claim 1, wherein correlating the specific area on the target window with a corresponding area on the source window comprises comparing a timestamp associated with the target window with a timestamp associated with the source window.

4. The method of claim 1, wherein the target window is a screen of the target system and the source window is a screen of the source system.

5. The method of claim 1, wherein the selection is a mouse click.

6. The method of claim 1, wherein detecting selection of a specific area on the target window comprises detecting a location of the mouse click on the target window.

7. The method of claim 6, wherein correlating the specific area on the target window with a corresponding area on the source window comprises determining where a corresponding mouse click would occur on the source window.

8. A computer program product for sharing hidden information in a virtual meeting, the computer program product comprising a computer-readable storage medium having computer-usable program code embodied therein, the computer-usable program code configured to perform the following when executed by at least one processor:
    share, by way of a web-conference server, a source window presented on a source system with a target window presented on a target system;
    detect selection of a specific area on the target window;
    communicate information associated with the selection from the target system to the source system;
    correlate the specific area on the target window with a corresponding area on the source window;
    determine whether the corresponding area on the source window links to hidden information; and
    if the corresponding area links to hidden information, communicate at least one of the hidden information and a link to the hidden information to the target system.

9. The computer program product of claim 8, wherein the hidden information is a hyperlink.

10. The computer program product of claim 8, wherein correlating the specific area on the target window with a corresponding area on the source window comprises comparing a timestamp associated with the target window with a timestamp associated with the source window.

11. The computer program product of claim 8, wherein the target window is a screen of the target system and the source window is a screen of the source system.

12. The computer program product of claim 8, wherein the selection is a mouse click.

13. The computer program product of claim 8, wherein detecting selection of a specific area on the target window comprises detecting a location of the mouse click on the target window.

14. The computer program product of claim 13, wherein correlating the specific area on the target window with a corresponding area on the source window comprises determining where a corresponding mouse click would occur on the source window.

15. A system for sharing hidden information in a virtual meeting, the system comprising:
    at least one processor;
    at least one memory device operably coupled to the at least one processor and storing instructions for execution on the at least one processor, the instructions causing the at least one processor to:
        share, by way of a web-conference server, a source window presented on a source system with a target window presented on a target system;
        detect selection of a specific area on the target window;
        communicate information associated with the selection from the target system to the source system;
        correlate the specific area on the target window with a corresponding area on the source window;
        determine whether the corresponding area on the source window links to hidden information; and
        if the corresponding area links to hidden information, communicate at least one of the hidden information and a link to the hidden information to the target system.

16. The system of claim 15, wherein the hidden information is a hyperlink.

17. The system of claim 15, wherein correlating the specific area on the target window with a corresponding area on the source window comprises comparing a timestamp associated with the target window with a timestamp associated with the source window.

18. The system of claim 15, wherein the target window is a screen of the target system and the source window is a screen of the source system.

19. The system of claim 15, wherein the selection is a mouse click.

20. The system of claim 15, wherein detecting selection of a specific area on the target window comprises detecting a location of the mouse click on the target window.

* * * * *